US011122849B2

(12) United States Patent
Hashimoto et al.

(10) Patent No.: US 11,122,849 B2
(45) Date of Patent: Sep. 21, 2021

(54) HEAD-MOUNTED DEVICE, HEATSTROKE PREVENTION SYSTEM, AND REHYDRATION ALARM SYSTEM

(71) Applicants: TOKYO UNIVERSITY OF SCIENCE FOUNDATION, Tokyo (JP); Fujita Corporation, Tokyo (JP)

(72) Inventors: Nobuaki Hashimoto, Tokyo (JP); Yoshinori Kumita, Tokyo (JP); Toshihito Kondo, Tokyo (JP)

(73) Assignees: TOKYO UNIVERSITY OF SCIENCE FOUNDATION, Tokyo (JP); FUJITA CORPORATION, Tokyo (JP)

( * ) Notice: Subject to any disclaimer, the term of this patent is extended or adjusted under 35 U.S.C. 154(b) by 16 days.

(21) Appl. No.: 16/756,526

(22) PCT Filed: Oct. 18, 2018

(86) PCT No.: PCT/JP2018/038896
§ 371 (c)(1),
(2) Date: Apr. 16, 2020

(87) PCT Pub. No.: WO2019/078308
PCT Pub. Date: Apr. 25, 2019

(65) Prior Publication Data
US 2021/0022430 A1    Jan. 28, 2021

(30) Foreign Application Priority Data

Oct. 18, 2017  (JP) .............................. JP2017-201844
Mar. 30, 2018  (JP) .............................. JP2018-068477

(51) Int. Cl.
*A42B 3/00*    (2006.01)
*A42B 3/28*    (2006.01)
(Continued)

(52) U.S. Cl.
CPC .............. *A42B 3/286* (2013.01); *A42B 3/046* (2013.01); *A42B 3/0433* (2013.01); *A42B 3/283* (2013.01);
(Continued)

(58) Field of Classification Search
CPC ....... A42B 3/286; A42B 3/046; A42B 3/0433; A42B 3/30; G08B 21/0453; G08B 21/20;
(Continued)

(56) References Cited

U.S. PATENT DOCUMENTS 4,115,874 A  *  9/1978  Hasegawa .............. A42B 3/281
                                                      2/171.3
8,156,570 B1 *  4/2012  Hockaday .............. A42B 3/285
                                                        2/7
(Continued)

FOREIGN PATENT DOCUMENTS

JP          3010064 U       4/1995
JP       2014-153876 A      8/2014
(Continued)

OTHER PUBLICATIONS

"Lets Prevent Heatstroke", Ministry of Health, Labour and Welfare, Labour Standards Bureau, Apr. 2013.
(Continued)

*Primary Examiner* — Ojiako K Nwugo
(74) *Attorney, Agent, or Firm* — Arent Fox LLP; Michael Fainberg

(57) ABSTRACT

A head-mounted device includes: an outer shell; a first flow channel that is a gap between a head of a wearer and the outer shell; a second flow channel provided in the outer shell and joining the first flow channel; a fan configured to blow air from one of the first flow channel and the second flow channel to the other of the first flow channel and the second flow channel; a first humidity sensor configured to measure
(Continued)

an absolute humidity of intake air entering one of the first flow channel and the second flow channel; and a second humidity sensor configured to measure an absolute humidity of exhaust air exiting from the other of the first flow channel and the second flow channel.

18 Claims, 5 Drawing Sheets

(51) Int. Cl.
*G01N 25/66* (2006.01)
*G08B 21/04* (2006.01)
*A42B 3/04* (2006.01)
*A42B 3/30* (2006.01)
*G01N 25/62* (2006.01)
*G08B 21/20* (2006.01)
*G08B 21/02* (2006.01)
*G08B 21/18* (2006.01)

(52) U.S. Cl.
CPC .............. *A42B 3/30* (2013.01); *G01N 25/66* (2013.01); *G08B 21/0453* (2013.01); *G01N 25/62* (2013.01); *G08B 21/02* (2013.01); *G08B 21/18* (2013.01); *G08B 21/182* (2013.01); *G08B 21/20* (2013.01)

(58) Field of Classification Search
CPC ........ G08B 21/02; G08B 21/18; G01N 25/66; G01N 25/62
See application file for complete search history.

(56) References Cited

U.S. PATENT DOCUMENTS

| | | | |
|---|---|---|---|
| 9,775,396 B1* | 10/2017 | Olivares Velasco ... | G16H 40/67 |
| 2007/0028370 A1* | 2/2007 | Seng ...................... | A42B 3/046 |
| | | | 2/410 |
| 2010/0095439 A1* | 4/2010 | Nolan ...................... | A42B 3/24 |
| | | | 2/421 |
| 2013/0291271 A1* | 11/2013 | Becker ................... | B23K 9/322 |
| | | | 2/8.2 |
| 2015/0223549 A1* | 8/2015 | Osterhout .............. | A42B 3/285 |
| | | | 62/3.1 |
| 2016/0210933 A1* | 7/2016 | Liang ................. | G01C 21/3667 |
| 2016/0342840 A1* | 11/2016 | Mullins .............. | G02B 27/0172 |
| 2017/0266676 A1* | 9/2017 | Fateh .................. | A63F 13/5255 |
| 2017/0273386 A1* | 9/2017 | Kuo ...................... | A42B 3/0466 |
| 2018/0168267 A1* | 6/2018 | Giles ...................... | A42B 3/063 |
| 2019/0358473 A1* | 11/2019 | Szasz .................... | G08B 21/182 |

FOREIGN PATENT DOCUMENTS

| | | |
|---|---|---|
| JP | 2015-154920 A | 8/2015 |
| JP | 2016-102282 A | 6/2016 |
| JP | 2016-132835 A | 7/2016 |
| JP | 2016-163694 A | 9/2016 |
| JP | 2017-104327 A | 6/2017 |
| JP | 2017-115275 A | 6/2017 |
| JP | 2017-153576 A | 9/2017 |

OTHER PUBLICATIONS

"Lets Prevent Heatstroke", Tokyo Labour Bureau, Labor Standards Department Health Division, Feb. 2017.

* cited by examiner

HEAD-MOUNTED DEVICE, HEATSTROKE PREVENTION SYSTEM, AND REHYDRATION ALARM SYSTEM

CROSS-REFERENCE TO RELATED APPLICATION

This application is a National Stage of PCT international application Ser. No. PCT/JP2018/038896 filed on Oct. 18, 2018, which designates the United States, incorporated herein by reference, and which is based upon and claims the benefit of priority from Japanese Patent Application No. 2017-201844 filed on Oct. 18, 2017, and Japanese Patent Application No. 2018-068477 filed on Mar. 30, 2018, the entire contents of which are incorporated herein by reference.

TECHNICAL FIELD

The present invention relates to a head-mounted device, a heatstroke prevention system, and a rehydration alarm system.

BACKGROUND

Workers may work under a high temperature environment on a construction site or the like. Under the high temperature environment, it is necessary to prevent heatstroke of workers. A conventional wearable device for a worker in order to prevent heatstroke has been known. For example, Patent Literature 1 describes a helmet provided with a temperature sensor and a humidity sensor. The helmet according to Patent Literature 1 enables a supervisor to grasp the situations in the helmet, thereby allowing the supervisor to inform a worker. Non Patent Literature 1 describes a sign of exposure to heat that needs to be stopped. Non Patent Literature 2 describes symptoms of heatstroke.

Patent Literature 1: Japanese Patent Application Laid-open No. 2017-115275

NON PATENT LITERATURE

Non Patent Literature 1: "Let's Prevent Heatstroke", Ministry of Health, Labour and Welfare, Labour Standards Bureau, Prefectural Labour Bureau, Labour Standards Supervision Office, April 2013

Non Patent Literature 2: "Let's Prevent Heatstroke at Work", Tokyo Labor Bureau Health Service Division, February 2017

The helmet in Patent Literature 1, however, merely measures the temperature and the humidity in the helmet. Thus, the helmet has a limitation in accurate detection of a body condition of a wearer as a worker, the body condition necessary for estimating a risk for heatstroke, particularly such as a decrease amount of body water of the worker. Therefore, it is difficult to improve accuracy in estimating the risk for heatstroke.

SUMMARY

The present disclosure has been made in view of the above-mentioned problem, and aims to provide a head-mounted device capable of measuring, with higher accuracy, the body condition of a wearer as a worker, the body condition necessary for estimating the risk for heatstroke.

In order to achieve the above-mentioned purpose, a head-mounted device according to the present invention includes: an outer shell; a first flow channel that is a gap between a head of a wearer and the outer shell; a second flow channel provided in the outer shell and joining the first flow channel; a fan configured to blow air from one of the first flow channel and the second flow channel to the other of the first flow channel and the second flow channel; a first humidity sensor configured to measure an absolute humidity of intake air entering one of the first flow channel and the second flow channel; and a second humidity sensor configured to measure an absolute humidity of exhaust air exiting from the other of the first flow channel and the second flow channel.

As a preferred aspect of the head-mounted device, the fan is configured to blow air with an amount such that a temperature of the exhaust air becomes equal to or higher than a dew-point temperature of the exhaust air.

As a preferred aspect of the head-mounted device, the first humidity sensor is located on an outside of the outer shell.

As a preferred aspect of the head-mounted device, the first humidity sensor is configured to measure a temperature and a relative humidity of the intake air, and is located on an inner surface of the outer shell.

As a preferred aspect of the head-mounted device, the fan is configured to blow air from the first flow channel toward the second flow channel, and is located at a downstream end portion of the first flow channel, and the second humidity sensor is located downstream of the fan.

As a preferred aspect of the head-mounted device, the head-mounted device includes a body temperature sensor configured to measure a body temperature of the wearer.

As a preferred aspect of the head-mounted device, the body temperature sensor is configured to measure a deep body temperature.

As a preferred aspect of the head-mounted device, the head-mounted device includes a heartbeat sensor configured to measure a heart rate of the wearer.

As a preferred aspect of the head-mounted device, the head-mounted device includes an environmental sensor configured to measure a wet-bulb temperature and a black-bulb temperature around the wearer.

As a preferred aspect of the head-mounted device, the head-mounted device includes a control device configured to calculate an amount of sweating of the wearer based on information obtained from the first humidity sensor and the second humidity sensor; and a warning device configured to issue a warning when transition of the amount of sweating satisfies a predetermined condition.

A heatstroke prevention system according to another aspect of the present invention includes: the head-mounted device described above; and a management device. The head-mounted device includes a communication device configured to transmit, by wireless communication, information obtained from the first humidity sensor and the second humidity sensor. The management device is configured to receive the information from the communication device, and store an amount of sweating of the wearer.

As a preferred aspect of the heatstroke prevention system, the heatstroke prevention system includes a warning device configured to issue a warning to a supervisor when transition of the amount of sweating satisfies a predetermined condition.

As a preferred aspect of the heatstroke prevention system, the head-mounted device includes a warning device configured to issue a warning to the wearer when transition of the amount of sweating satisfies a predetermined condition.

According to the present disclosure, the head-mounted device capable of measuring, with higher accuracy, a body condition of a wearer as a worker that is necessary for estimating a risk for heatstroke can be provided.

DETAILED DESCRIPTION

The present invention is described in detail below with reference to the drawings. The present invention is not limited to modes (hereinafter referred to as embodiments) for carrying out the present invention. Components in the following embodiments include a component that is easily conceivable by those skilled in the art, a component that is substantially identical thereto, and a component within a range of equivalents. Furthermore, the components disclosed in the following embodiments can be combined as appropriate.

Embodiment

Figure 1:
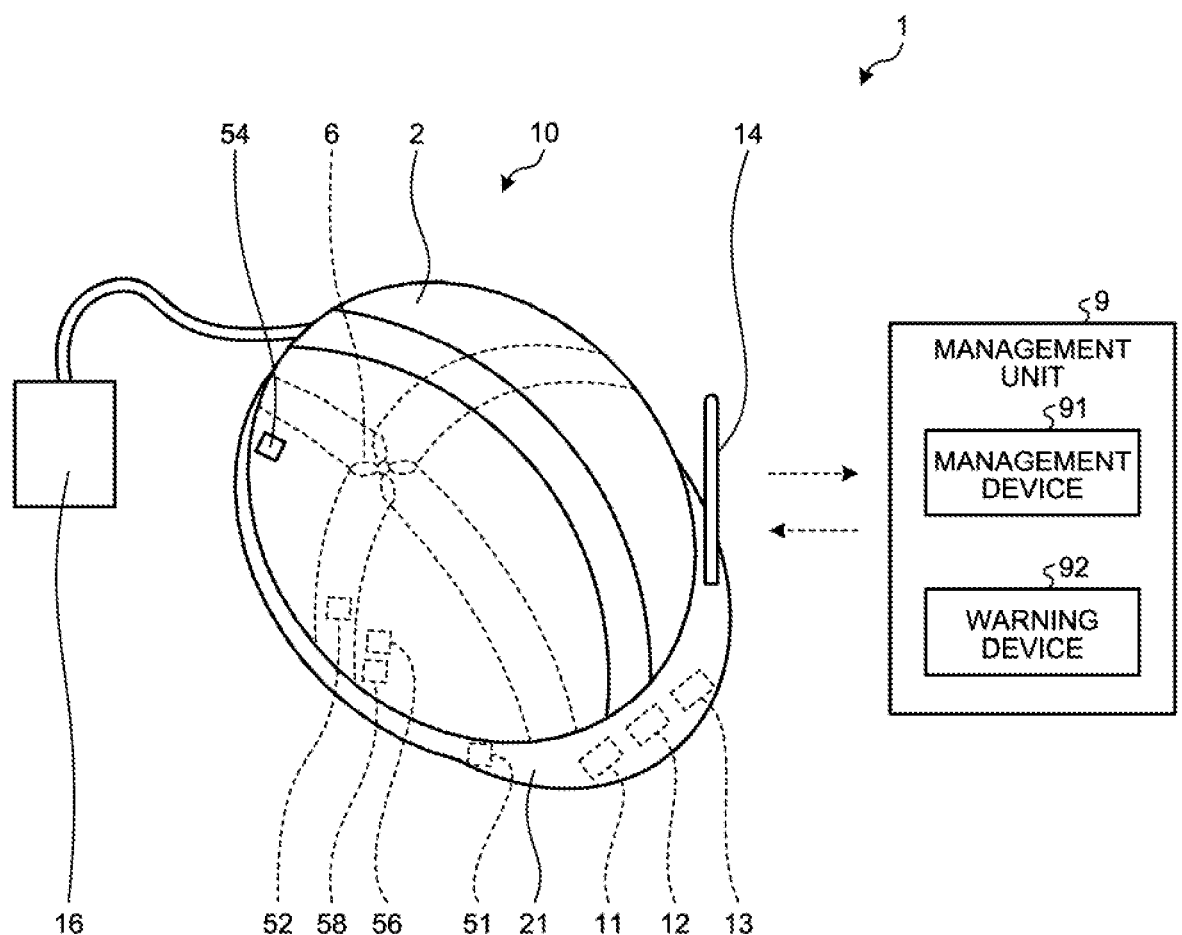
FIG. 1 is a schematic view of a heatstroke prevention system according to an embodiment.
Figure 2:
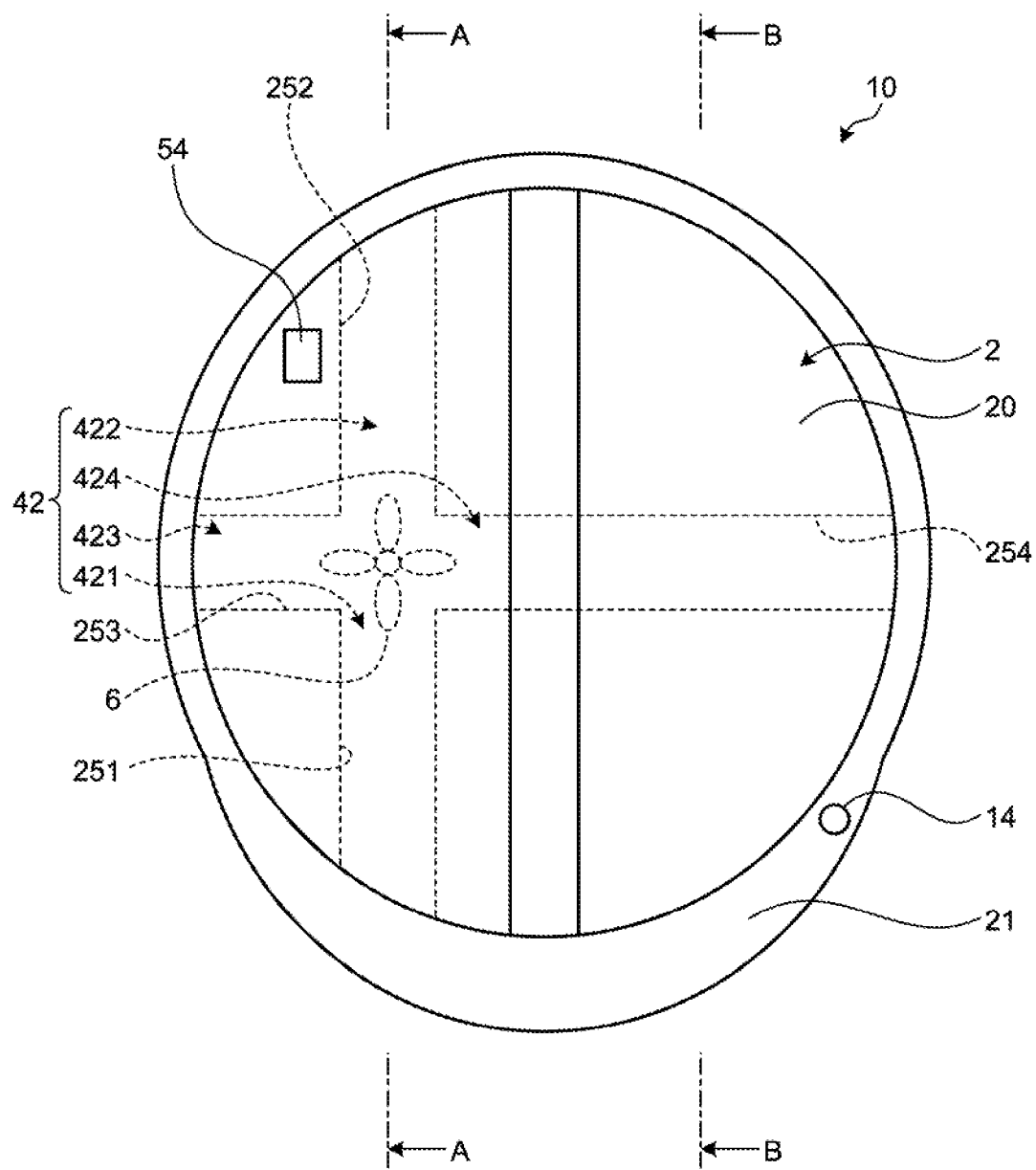
FIG. 2 is a plan view of a head-mounted device according to the embodiment.
Figure 3:
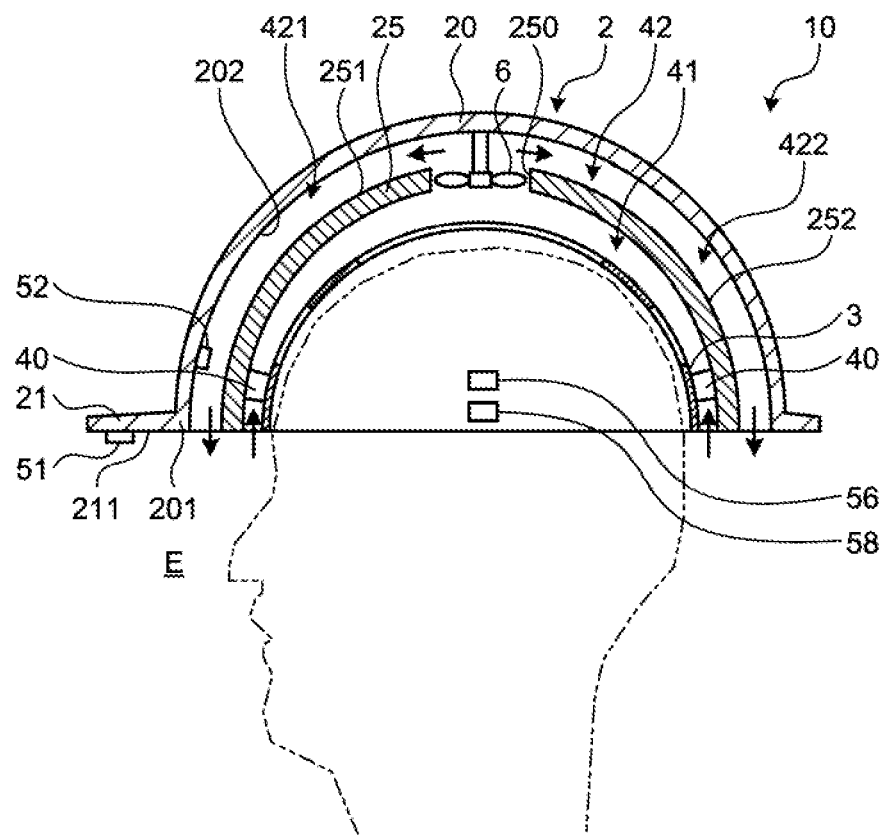
FIG. 3 is a cross-sectional view taken along the line A-A in FIG. 2.
Figure 4:
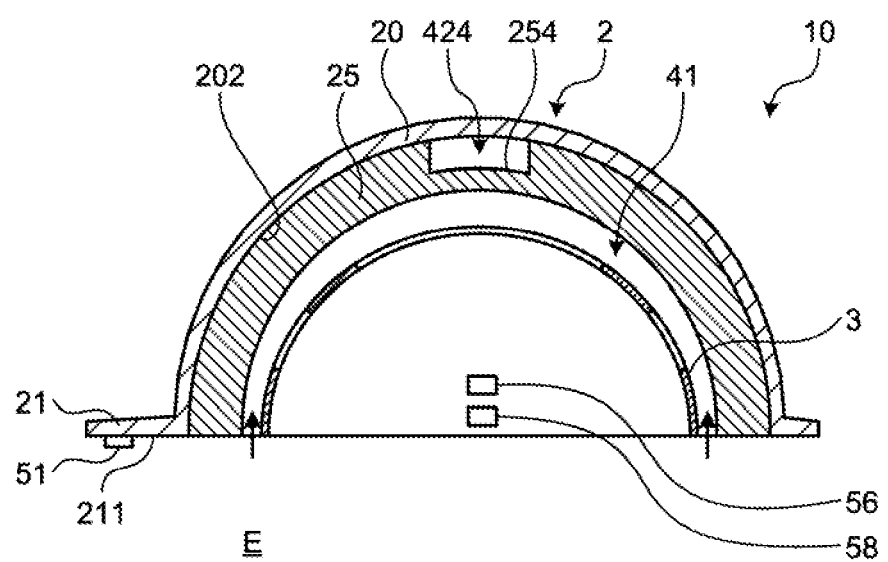
FIG. 4 is a cross-sectional view taken along the line B-B in FIG. 2.

FIG. 1 is a schematic view of a heatstroke prevention system according to an embodiment. FIG. 2 is a plan view of a head-mounted device according to the embodiment. FIG. 3 is a cross-sectional view taken along the line A-A in FIG. 2. FIG. 4 is a cross-sectional view taken along the line B-B in FIG. 2.

A heatstroke prevention system 1 according to the present embodiment is a system for preventing the onset of heatstroke of a worker. The heatstroke prevention system 1 is applied to, for example, a worker on a construction site or the like. The heatstroke prevention system 1 is also a rehydration alarm system for alarming that the worker should be rehydrated, instructing a worker to be rehydrated, or promoting or instructing a worker to have a break. As illustrated in FIG. 1, the heatstroke prevention system 1 includes a head-mounted device 10 and a management unit 9.

The head-mounted device 10 is a device to be mounted to the head of a worker. In the following description, a person who wears the head-mounted device 10 is referred to as "wearer". For example, the head-mounted device 10 according to the present embodiment is a helmet. As illustrated in FIG. 1 to FIG. 4, the head-mounted device 10 includes an inner shell 3, an outer shell 2, a spacer 40, a fan 6, a battery 16, a first flow channel 41, a second flow channel 421, a second flow channel 422, a second flow channel 423, a second flow channel 424, a first humidity sensor 51, a second humidity sensor 52, a body temperature sensor 56, a heartbeat sensor 58, an environmental sensor 54, a control device 11, a warning device 12, a communication device 13, and an antenna 14. In the following description, when the second flow channel 421, the second flow channel 422, the second flow channel 423, and the second flow channel 424 need not be distinguished from one another, they are referred to as the "second flow channel 42".

As illustrated in FIG. 3, the inner shell 3 is a member to face the head of a wearer. The inner shell 3 is made of, for example, a synthetic resin or a cloth. The inner shell 3 has a plurality of gaps, and covers part of the head of the wearer. Sweat from the head of the wearer becomes water vapor, and passes through the inner shell 3 without being blocked by the inner shell 3. The inner shell 3 may cover the whole of the head. In such a case, the inner shell 3 is made of a material having moisture permeability.

As illustrated in FIG. 3, the outer shell 2 is a semispherical member covering the inner shell 3. The outer shell 2 includes a main body 20, a flange 21, and a buffer 25. For example, the main body 20 is made of a synthetic resin. The flange 21 is formed integrally with the main body 20, and protrudes from a lower end portion 201 of the main body 20 in a direction away from the wearer. The buffer 25 is mounted on an inner surface 202 of the main body 20. The inner surface of the buffer 25 faces the inner shell 3. The buffer 25 is made of, for example, polystyrene foam. The buffer 25 is preferably made of a material having closed pores. This prevents water vapor from passing through the buffer 25. In the following description, a region outside a substantially semispherical region surrounded by the outer shell 2 is referred to as "outside E".

As illustrated in FIG. 2 to FIG. 4, the buffer 25 includes a recess 250, a recess 251, a recess 252, a recess 253, and a recess 254. The recess 250 is a hole provided in the inner surface of the buffer 25. The recess 251, the recess 252, the recess 253, and the recess 254 are grooves provided in an outer surface of the buffer 25, and extend from the recess 250 toward end portions of the main body 20 along the main body 20.

As illustrated in FIG. 3, the spacer 40 is disposed between the inner shell 3 and the outer shell 2. More specifically, the spacer 40 is sandwiched between the inner shell 3 and the buffer 25. Thus, there is a gap between the inner shell 3 and the buffer 25.

As illustrated in FIG. 3, the fan 6 is provided to the outer shell 2. The fan 6 is disposed in the recess 250 of the buffer 25. For example, according to the present embodiment, the fan 6 guides air on the inner shell 3 side with respect to the buffer 25 toward the main body 20 side. In other words, the fan 6 moves the air from the lower side to the upper side. An air volume from the fan 6 can be adjusted manually or by a control circuit included in the control device 11 described later. The fan 6 is adjusted to blow air with the air volume such that a temperature of exhaust air exiting from the second flow channel 42 becomes equal to or higher than a dew-point temperature of exhaust air. In other words, the fan 6 is adjusted to blow air with the air volume such that no condensation occurs around the exhaust air. The minimum air volume from the fan 6 is preferably set such that the temperature of exhaust air becomes equal to or higher than the dew-point temperature. This is because a typical humidity sensor cannot measure the humidity of air, the relative humidity of which is higher than 100% (humidity of air equal to or lower than dew-point temperature). In order to set the relative humidity of exhaust air to be 100% or lower, the control device 11 may increase the air volume from the fan 6 such that a temperature measured by the second humidity sensor 52 described later becomes equal to or higher than the dew-point temperature. In the case of usage under a typical working environment in which the relative humidity of exhaust air is not 100% (environment in which no condensation occurs around exhaust air), the exhaust air becomes equal to or higher than the dew point even when the air volume from the fan 6 is simply manually set to the desired air volume in accordance with tolerance of the wearer to hotness and an amount of sweating. Thus, the second humidity sensor 52 described later can measure the accurate absolute humidity. The minimum air volume from the fan 6 is preferably 0.01 l/min or more so that air on the surface of the second humidity sensor 52 is replaced. The air volume from the fan 6 is more preferably 0.01 l/min or more and 500 l/min or less.

The battery 16 supplies power to the fan 6, the first humidity sensor 51, the second humidity sensor 52, the body temperature sensor 56, the heartbeat sensor 58, the environmental sensor 54, the control device 11, the warning device 12, the communication device 13, and the antenna 14. The control device 11, the warning device 12, the communication device 13, and the antenna 14 may be formed on an integrated substrate.

As illustrated in FIG. 3, the first flow channel 41 is a gap between the head of a wearer and the buffer 25. The first flow channel 41 has a lower end portion joins the outside E. The first flow channel 41 has an upper end portion joining the recess 250 in the buffer 25. Thus, the fan 6 is located at the upper end portion of the first flow channel 41. In other words, the fan 6 is located at a downstream end portion of the first flow channel 41.

As illustrated in FIGS. 2 to 4, the second flow channel 42 is a flow channel provided in the outer shell 2. The second flow channel 421 is a gap between the main body 20 and the recess 251 in the buffer 25. The second flow channel 422 is a gap between the main body 20 and the recess 252. The second flow channel 423 is a gap between the main body 20 and the recess 253. The second flow channel 424 is a gap between the main body 20 and the recess 254. The second flow channel 42 has a lower end portion joining the outside E. The second flow channel 42 has an upper end portion joining the recess 250 in the buffer 25. Thus, the first flow channel 41 joining the second flow channel 42 through the recess 250.

The fan 6 blows air from the first flow channel 41 toward the second flow channel 42. Air enters the first flow channel 41 from the outside E, and is discharged from the second flow channel 42 to the outside E. When the wearer sweats, water vapor is supplied to the first flow channel 41. Air in the first flow channel 41 including water vapor by sweat is discharged to the outside E through the second flow channel 42.

The first humidity sensor 51 is a sensor that measures an absolute humidity (hereinafter referred to as "first absolute humidity") of intake air entering the first flow channel 41. The absolute humidity is the amount of water vapor included in air per unit volume. As illustrated in FIG. 3, the first humidity sensor 51 is located on the outside E. The first humidity sensor 51 is, for example, mounted on an inner surface 211 (lower surface) of the flange 21. The first humidity sensor 51 measures a temperature and a relative humidity of air on the outside E.

The second humidity sensor 52 is a sensor that measures an absolute humidity (hereinafter referred to as "second absolute humidity") of exhaust air exiting from the second flow channel 42. As illustrated in FIG. 3, the second humidity sensor 52 is located in the second flow channel 42. That is, the second humidity sensor 52 is located downstream of the fan 6. The second humidity sensor 52 is, for example, mounted on the inner surface 202 of the main body 20 that faces the second flow channel 421. The second humidity sensor 52 measures a temperature and a relative humidity of air in the second flow channel 421.

The body temperature sensor 56 is a sensor that measures a body temperature of the wearer. As illustrated in FIG. 3, the body temperature sensor 56 is mounted on the inner surface of the inner shell 3. The body temperature sensor 56 is in contact with the wearer. The body temperature sensor 56 is more preferably capable of measuring a deep body temperature of the wearer. Examples of indices of the deep body temperature include an oral temperature, a rectal temperature, and a tympanic temperature. In the case where the body temperature sensor 56 measures the deep body temperature, the mounting position of the body temperature sensor 56 is adjusted as appropriate.

The heartbeat sensor 58 is a sensor that measures the heart rate of the wearer. As illustrated in FIG. 3, the heartbeat sensor 58 is mounted on the inner surface of the inner shell 3. The heartbeat sensor 58 is in contact with the wearer. The heartbeat sensor 58 is preferably in contact with the temple of the wearer.

The environmental sensor 54 is a sensor that measures a wet-bulb temperature, a dry-bulb temperature, and a black-bulb temperature around the wearer. As illustrated in FIG. 1, the environmental sensor 54 is mounted on the outer surface of the outer shell 2.

The control device 11, which is a computer, includes, for example, a central processing unit (CPU), a read only memory (ROM), a random access memory (RAM), an input interface, and an output interface. The control device 11 is electrically connected to the first humidity sensor 51, the second humidity sensor 52, the body temperature sensor 56, the heartbeat sensor 58, and the environmental sensor 54, and receives measured values. The control device 11 calculates medical parameters based on information obtained from the sensors. The control device 11, for example, calculates the amount of sweating as a medical parameter. The control device 11 preferably calculates a fluctuation in amount of sweating, a fluctuation in deep body temperature, and a heartbeat interval. Furthermore, the control device 11 preferably indexes a working environment and a degree of personal risk for heatstroke of the wearer from information obtained from the above-described sensors and calculated medical parameters, and controls the warning device 12 or the communication device 13 based on the index. The control device 11 is electrically connected to the fan 6, and may control the air volume from the fan 6. The control device 11 is mounted on the inner surface 211 of the flange 21 as illustrated in FIG. 1.

The control device 11 stores information about the wearer, such as a body weight, age, a working location, and working processes of the wearer. The control device 11, for example, can obtain the information about the wearer stored in a management device 91 described later through the communication device 13. Alternatively, the information about the wearer may be directly input to the control device 11 before work.

The control device 11 calculates a first absolute humidity based on the temperature and relative humidity of intake air received from the first humidity sensor 51. There are various kinds of approximate expressions for estimating the absolute humidity from the relative humidity. In this case, the absolute humidity is estimated by the Tetens equation, which is relatively commonly used. When the first absolute humidity is X [g/m$^3$], the temperature of intake air is $t_A$ [K], the relative humidity of intake air is $RH_A$ [%], and saturation vapor pressure of intake air is $e_A$ [hPa], the control device 11 obtains X from Equations (1) and (2) described below.

$$e_A = 6.11 \times 10^{\frac{7.5 t_A}{(t_A+237.3)}} \quad (1)$$

$$X = 217 \times \frac{e_A}{273.15 + t_A} \times \frac{RH_A}{100} \quad (2)$$

The control device 11 calculates a mass of water entering the first flow channel 41 per unit time based on the first absolute humidity (X) and the air volume from the fan 6. When the mass of water entering the first flow channel 41 per unit time is A [g/min] and the air volume from the fan 6 is V [m³/min], the control device 11 obtains A from Equation (3) described below.

$$A = XV \quad (3)$$

The control device 11 calculates a second absolute humidity based on the temperature and relative humidity of exhaust air received from the second humidity sensor 52. When the second absolute humidity is Y [g/m³], the temperature of exhaust air is $t_B$ [K], the relative humidity of exhaust air is $RH_B$ [%], and the saturation vapor pressure of exhaust air is $e_B$ [hPa], the control device 11 obtains Y from Equations (4) and (5) described below.

$$e_B = 6.11 \times 10^{\frac{7.5 t_B}{(t_B+237.3)}} \quad (4)$$

$$Y = 217 \times \frac{e_B}{273.15 + t_B} \times \frac{RH_B}{100} \quad (5)$$

The control device 11 calculates the sum of the masses of water exiting from the second flow channel 421, the second flow channel 422, the second flow channel 423, and the second flow channel 424 per unit time based on the second absolute humidity (Y) and the air volume from the fan 6. When the sum of the masses of water is B [g/min], the control device 11 obtains B from Equation (6) described below.

$$B = YV \quad (6)$$

When the mass of water evaporated from the head of the wearer per unit time is C [g/min], the control device 11 obtains C from Equation (7) described below. In the following description, the mass (C) of water evaporated from the head of the wearer per unit time is referred to as "amount of sweating".

$$C = B - A \quad (7)$$

Figure 5:
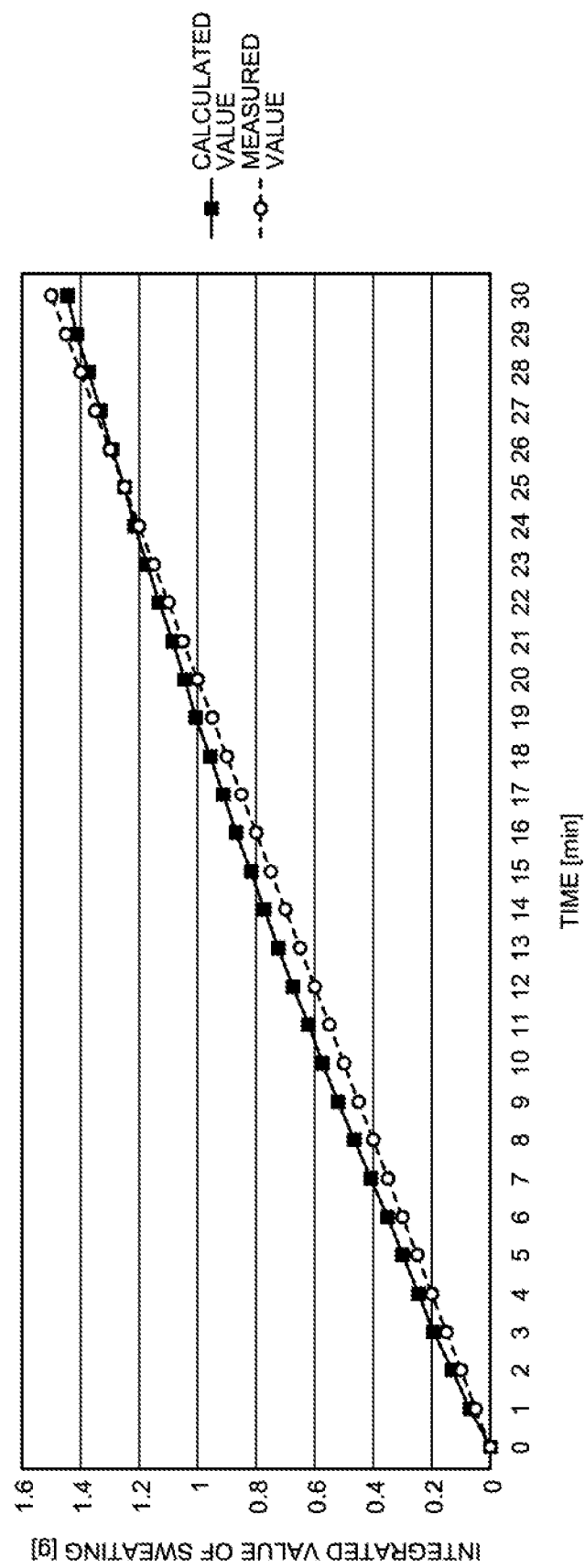
FIG. 5 is a graph illustrating results of an experiment of comparing an amount of sweating calculated by a control device and a measured amount of sweating.

FIG. 5 is a graph illustrating the experimental result of comparing the amount of sweating calculated by the control device and the measured amount of sweating. An experiment to compare the amount of sweating calculated by the control device 11 by the above-mentioned method with the measured amount of sweating was performed by using a device (mannequin head) imitating the head of a person. The vertical axis in FIG. 5 is an integrated value [g] of the amount of sweating. The solid line in FIG. 5 indicates transition of an integrated value (calculated value) of the amount of sweating calculated by the control device 11. The broken line in FIG. 5 indicates transition of an integrated value (measured value) of the measured amount of sweating. The measured amount of sweating is the amount of sweating measured by using an electronic balance. As illustrated in FIG. 5, there is a small difference between the calculated value and the measured value. The control device 11 can calculate the amount of sweating with high accuracy. In order for the control device 11 to calculate the amount of sweating with high accuracy, it is preferable to improve the accuracy of the air volume from the fan 6 and reduce noise of each sensor. In FIG. 5, the sweating substantial amount by time integration is displayed, but the sweating substantial amount per unit time may be displayed. In this manner, a sign of a high risk for heatstroke can be determined by an abnormal value, for example, when the amount of sweating after a given period has increased abnormally.

The control device 11 calculates and stores the amount of sweating for each predetermined interval. The control device 11 determines whether the wearer is at risk for heatstroke based on the transition of the amount of sweating. When the transition of the amount of sweating satisfies a predetermined condition, the control device 11 determines that the wearer is at risk for heatstroke. The control device 11, for example, stores a predetermined threshold for the amount of sweating, and determines that the wearer is at risk for heatstroke when the amount of sweating exceeds the threshold. Alternatively, the control device 11 stores a predetermined threshold for the amount of sweating and a threshold count, and determines that the wearer is at risk for heatstroke when the number of times the amount of sweating has exceeded the threshold exceeds the threshold count. Alternatively, the control device 11 integrates the amount of sweating, and determines that the wearer is at risk for heatstroke when the integrated amount of sweating exceeds a threshold. The threshold in this case is, for example, a mass corresponding to 1.5% of a body weight of the wearer (see Non Patent Literature 1). A decrease amount of the body weight of the wearer can be measured by an amount of whole-body sweating of the wearer. To prevent heatstroke disease, it is preferable to use a value smaller than the above-mentioned threshold as the threshold. While the control device 11 can calculate an amount of sweating of the head, the control device 11 can estimate the amount of whole-body sweating (decrease amount of body weight) from the amount of head sweating by storing in advance a correlation between the amount of sweating of the head and the amount of sweating of the whole body. Alternatively, the control device 11 stores a threshold for the amount of sweating integrated in a predetermined period, and determines that the wearer is at risk for heatstroke when the amount of sweating integrated in a predetermined period exceeds the threshold. Alternatively, the control device 11 stores a first threshold for the amount of sweating integrated in a predetermined period and a second threshold for wet-bulb temperature (or dry-bulb temperature) around the wearer, and determines if the wearer is at risk for heatstroke based on the first threshold and the second threshold. For example, when the wet-bulb temperature exceeds the second threshold and the amount of sweating integrated in a predetermined period is lower than the first threshold, the control device 11 determines that the wearer is at risk for heatstroke.

When the transition of the amount of sweating satisfies a predetermined condition, the control device 11 determines that the wearer needs to be rehydrated. The control device 11, for example, stores a predetermined threshold for the amount of whole-body sweating, and determines that the wearer needs to be rehydrated when the amount of whole-body sweating exceeds the threshold. The control device 11 calculates the amount of water that the wearer should replenish based on information about the amount of sweating. The amount of water that the wearer should replenish calculated by the control device 11, for example, corresponds to the amount of whole-body sweating. The amount of water that the wearer should replenish calculated by the control device 11 may be different from the amount of water corresponding to the amount of whole-body sweating.

The control device 11 determines whether the wearer is at risk for heatstroke based on transition of body temperature. The control device 11 determines that the wearer is at risk for heatstroke, for example, when the body temperature received from the body temperature sensor 56 does not return to the body temperature measured before the start of work while the wearer is having a break (see Non Patent Literature 1).

The control device 11 determines whether the wearer is at risk for heatstroke based on transition of the heart rate. The control device 11 determines that the wearer is at risk for heatstroke, for example, when a state in which the heart rate per minute exceeds a value obtained by subtracting the age of the wearer from 180 continues for several minutes. Alternatively, the control device 11 determines that the wearer is at risk for heatstroke when the heart rate per minute after the elapse of one minute since the peak of activity of the wearer exceeds 120 (see Non Patent Literature 1).

The control device 11 calculates a wet-bulb globe temperature (WBGT) based on information measured by the environmental sensor 54. The control device 11 stores a working process of the wearer, and thus grasps whether the wearer is outdoors or indoors. When the wearer is outdoors, the control device 11 calculates the wet-bulb globe temperature based on a wet-bulb temperature, a dry-bulb temperature, and a black-bulb temperature. When the wearer is indoors, the control device 11 calculates the wet-bulb globe temperature based on the wet-bulb temperature and the black-bulb temperature. The control device 11 can also use the wet-bulb globe temperature for determination as to whether the wearer is at risk for heatstroke.

The control device 11 may determine whether the wearer is at risk for heatstroke by combining information obtained from the body temperature sensor 56, the heartbeat sensor 58, and the environmental sensor 54 with the amount of sweating.

The warning device 12 is a device that allows the wearer to recognize that he/she is at risk for heatstroke. The warning device 12 is mounted on the inner surface 211 of the flange 21 as illustrated in FIG. 1. When the control device 11 determines that the wearer is at risk for heatstroke, the warning device 12 issues a warning. A type of the warning is not particularly limited. Examples of the warning include sound, light, and vibration. The warning device 12 is a device that allows the wearer himself/herself to recognize that he/she should be rehydrated. When the control device 11 determines that the wearer should be rehydrated, the warning device 12 issues a warning. A type of the warning is not particularly limited. Examples of the warning include sound, light, and vibration. When the control device 11 determines that the wearer should be rehydrated, the warning device 12, for example, displays the amount of water that the wearer should replenish calculated by the control device 11. When the control device 11 determines that the wearer should be rehydrated, the warning device 12, for example, instructs, by voice, the wearer to drink water with the amount that the wearer should replenish calculated by the control device 11. In the warning device 12, an instruction for rehydration and an instruction for prompting a break based on, for example, continuous working hours, may be used in combination.

The communication device 13 and the antenna 14 are devices that transmits information obtained by the control device 11 to the management unit 9. As illustrated in FIG. 1, the communication device 13 is mounted on the inner surface 211 of the flange 21. As illustrated in FIG. 1, the antenna 14 is mounted on the outer surface of the flange 21.

The management unit 9 is where a supervisor who monitors the wearer is located. As illustrated in FIG. 1, the management unit 9 includes a management device 91 and a warning device 92. The management device 91 receives information from a plurality of head-mounted devices 10. The management device 91 stores information about a plurality of wearers, such as work sites, working processes, and ages.

The management device 91 stores the amount of sweating obtained from the control device 11 and information obtained from each sensor. The management device 91 determines whether the wearer is at risk for heatstroke based on the transition of the amount of sweating, the body temperature, the heart rate, and the wet-bulb globe temperature. The management device 91 determines whether the wearer needs to be rehydrated based on the transition of the amount of sweating, the body temperature, the heart rate, and the wet-bulb globe temperature. A specific determination method may be the same as or different from the determination method in the control device 11.

The warning device 92 is a device that allows a supervisor to recognize that the wearer is at risk for heatstroke. When the management device 91 determines that the wearer is at risk for heatstroke, the warning device 92 issues a warning to the supervisor. The warning device 92 is a device that allows the supervisor to recognize that the wearer should be rehydrated. When the management device 91 determines that the wearer should be rehydrated, the warning device 92 issues a warning to the supervisor. Similarly to the warning device 12, a type of the warning is not particularly limited. In the warning device 92, an instruction for rehydration and an instruction for prompting a break based on, for example, continuous working hours, may be used in combination.

The materials of the inner shell 3 and the outer shell 2 are merely examples, and not particularly limited. The head-mounted device 10 is not necessarily required to include the inner shell 3. For example, the spacer 40 may be in contact with the head so that a gap is formed between the outer shell 2 and the head.

In the head-mounted device 10, air on the outside E is not necessarily required to enter from the first flow channel 41. The air on the outside E may enter from the second flow channel 42 and be discharged from the first flow channel 41. In such a case, the second humidity sensor 52 is preferably disposed near an exit of the first flow channel 41.

Air may flow in or out from a hole opened in the outer surface of the outer shell 2. When air flows out from the hole opened in the outer surface of the outer shell 2, the second humidity sensor 52 only needs to be disposed in the hole. When air flows in from the hole opened in the outer surface of the outer shell 2, the second humidity sensor 52 only needs to be disposed at, for example, a lower end portion of the first flow channel 41. The first humidity sensor 51 may be disposed on the inner surface 211 of the flange 21. When air flows in from a hole opened in the outer surface of the outer shell 2, the first humidity sensor 51 may be disposed in the hole. When air flows out or in from the hole opened in the outer surface of the outer shell 2 in this way, the hole is the second flow channel.

The number of the second humidity sensors 52 included in the head-mounted device 10 is not necessarily required to be one. For example, the respective second humidity sensors 52 may be disposed in the second flow channel 421, the second flow channel 422, the second flow channel 423, and the second flow channel 424. In such a case, the control device 11 preferably calculates the amount of sweating based on an average of measurement results of the second humidity sensors 52.

The head-mounted device 10 is not necessarily required to have a plurality of second flow channels 42, and only needs to have at least one second flow channel 42. That is, the head-mounted device 10 only needs to have at least one of the second flow channel 421, the second flow channel 422, the second flow channel 423, and the second flow channel 424.

In the case where the air volume of the fan 6 is automatically adjusted by the control device 11, the control device 11 may increase the air volume of the fan 6 when the temperature of exhaust air becomes lower than the dew-point temperature. The control device 11 may increase the air volume of the fan 6 as the amount of sweating increases. The fan 6 may blow air from the second flow channel 42 to the first flow channel 41.

The head-mounted device 10 is not necessarily required to include the body temperature sensor 56, the heartbeat sensor 58, and the environmental sensor 54. The head-mounted device 10 only needs to include at least the first humidity sensor 51 and the second humidity sensor 52 as sensors. The first humidity sensor 51 and the second humidity sensor 52 are not necessarily required to be sensors that measure a temperature and a relative humidity, and only need to measure an absolute humidity. The first humidity sensor 51 and the second humidity sensor 52 may be, for example, a moisture meter (infrared moisture meter) using light (near-infrared light). Moisture has characteristics of absorbing near-infrared light in a particular wavelength. An infrared moisture meter measures absolute humidity based on the magnitude of absorbance. The first humidity sensor 51 is not necessarily required to be disposed on the inner surface 211, and may be disposed, for example, on the inner surface of the buffer 25. When the fan 6 blows air from the second flow channel 42 to the first flow channel 41, the first humidity sensor 51 may be disposed on the inner surface 202. In this case, the second humidity sensor 52 is disposed, for example, on the inner surface of the buffer 25.

The head-mounted device 10 may include a sensor other than the above-mentioned sensors. The head-mounted device 10 may include, for example, a cerebral blood flow sensor that measures the cerebral blood flow of the wearer. As a cerebral blood flow sensor, a device that measures brain functions in a non-invasive manner from the scalp by using near-infrared light has been known. Such a device is called "Near Infrared Spectoroscopy (NIRS)". The head-mounted device 10 may include an acceleration sensor. In this manner, the head-mounted device 10 can detect dizziness or the like of the wearer.

The head-mounted device 10 is not necessarily required to include the communication device 13 and the antenna 14. Even in such a case, the head-mounted device 10 includes the warning device 12, and thus the wearer can recognize that he/she is at risk for heatstroke.

The head-mounted device 10 is not necessarily required to include the control device 11. In such a case, information measured by the first humidity sensor 51, the second humidity sensor 52, the body temperature sensor 56, the heartbeat sensor 58, and the environmental sensor 54 is transmitted to the management device 91 through the communication device 13. The management device 91 calculates the amount of sweating based on Equations (1) to (7) described above, and determines whether the wearer is at risk for heatstroke. Even when the head-mounted device 10 includes the control device 11, the management device 91 may calculate the amount of sweating.

The control device 11 and the management device 91 may accumulate information measured by each sensor in the past, and change a determination criterion as to whether the wearer is at risk for heatstroke based on the information. The control device 11 and the management device 91 may have artificial intelligence (AI). Learning accumulated information with the artificial intelligence can improve the accuracy of determination as to whether the wearer is at risk for heatstroke.

The head-mounted device 10 is not necessarily required to include the warning device 12. The management unit 9 is not necessarily required to include the warning device 92. The heatstroke prevention system 1 preferably has at least one of the warning device 12 and the warning device 92.

As described above, the head-mounted device 10 includes the outer shell 2, the first flow channel 41, the second flow channel 42, the fan 6, the first humidity sensor 51, and the second humidity sensor 52. The fan 6 is provided to the outer shell 2. The first flow channel 41 is a gap between the head of a wearer and the outer shell 2. The second flow channel 42 is provided in the outer shell 2 and joining the first flow channel 41. The fan 6 blows air from one of the first flow channel 41 and the second flow channel 42 to the other. The first humidity sensor 51 is a device that measures an absolute humidity of intake air entering one of the first flow channel 41 and the second flow channel 42. The second humidity sensor 52 is a device that measures an absolute humidity of exhaust air exiting from the other of the first flow channel 41 and the second flow channel 42.

In this manner, the head-mounted device 10 can obtain the amount of sweating of the head of the wearer based on information obtained from the first humidity sensor 51 and the second humidity sensor 52. As a result, the head-mounted device 10 can measure, with higher accuracy, the body condition of the wearer as a worker that is necessary for estimating the risk for heatstroke.

In the head-mounted device 10, the fan 6 blows air with an air volume such that the temperature of exhaust air becomes equal to or higher than a dew-point temperature of the exhaust air.

In this manner, the relative humidity of exhaust air becomes less than 100%. Condensation of water included in the exhaust air is prevented. Thus, the accuracy of the absolute humidity obtained by the second humidity sensor 52 is improved. As a result, the head-mounted device 10 can improve the accuracy of measurement of the amount of sweating.

In the head-mounted device 10, the first humidity sensor 51 is located on the outside E of the outer shell 2.

In this manner, the first humidity sensor 51 is less affected by water vapor caused by sweating of the wearer. Thus, the accuracy of the absolute humidity obtained by the first humidity sensor 51 is improved.

In the head-mounted device 10, the first humidity sensor 51 measures a temperature and a relative humidity of intake air, and is located on the inner surface (for example, inner surface 211) of the outer shell 2.

Thus, the outer shell 2 prevents insolation, thereby making the first humidity sensor 51 less susceptible to insolation. Fewer errors occur in the temperature of intake air measured by the first humidity sensor 51, and thus the accuracy of the absolute humidity obtained by the first humidity sensor 51 is improved.

In the head-mounted device 10, the fan 6 blows air from the first flow channel 41 toward the second flow channel 42, and is located at a downstream end portion of the first flow channel 41. The second humidity sensor 52 is located downstream of the fan 6.

In this manner, air including water vapor caused by sweat is agitated by the fan 6, and thus the distribution of the absolute humidity on the downstream side of the fan 6 is more easily made uniform. When a plurality of the second flow channels 42 are provided, the difference in absolute humidity among the second flow channels 42 is prevented. Thus, the accuracy of the absolute humidity obtained by the second humidity sensor 52 is improved.

The head-mounted device 10 includes the body temperature sensor 56 that measures a body temperature of the wearer. Consequently, the head-mounted device 10 can measure the body condition of the wearer with higher accuracy.

In the head-mounted device 10, the body temperature sensor 56 measures a deep body temperature. Consequently, the head-mounted device 10 can measure the body condition of the wearer with higher accuracy.

The head-mounted device 10 includes the heartbeat sensor 58 that measures a heart rate of the wearer. Consequently, the head-mounted device 10 can measure the body condition of the wearer with higher accuracy.

The head-mounted device 10 includes the environmental sensor 54 that measures a wet-bulb temperature and a black-bulb temperature around the wearer. In this manner, the head-mounted device 10 can measure the body condition of the wearer with higher accuracy.

The head-mounted device 10 includes the control device 11 and the warning device 12. The control device 11 calculates an amount of sweating of the wearer based on information obtained from the first humidity sensor 51 and the second humidity sensor 52. The warning device 12 issues a warning when transition of the amount of sweating satisfies a predetermined condition.

A massive amount of sweating is an early sign of heatstroke (see Non Patent Literature 2), and thus the head-mounted device 10 can detect whether the wearer shows the early sign of heatstroke. In other words, the head-mounted device 10 can detect heatstroke early. The head-mounted device 10 can improve the accuracy in estimating the risk for heatstroke. With the warning device 12, the wearer can early recognize that he/she is at risk for heatstroke. Thus, the head-mounted device 10 can prevent severe heatstroke.

The heatstroke prevention system 1 includes the head-mounted device 10 and the management device 91. The head-mounted device 10 includes the communication device 13 that transmits, by wireless communication, information obtained from the first humidity sensor 51 and the second humidity sensor 52. The management device 91 receives the information from the communication device 13, and stores an amount of sweating of the wearer.

In this manner, the management device 91 can detect whether the wearer at a remote location shows the early sign of heatstroke. That is, the heatstroke prevention system 1 can detect heatstroke early. The heatstroke prevention system 1 can improve the accuracy in estimating the risk for heatstroke. The supervisor can recognize, through the management device 91, that the wearer is at risk for heatstroke. Thus, the heatstroke prevention system 1 can prevent severe heatstroke.

The heatstroke prevention system 1 includes the warning device 92 that issues a warning to a supervisor when transition of the amount of sweating satisfies a predetermined condition.

In this manner, the supervisor can early recognize that the wearer is at risk for heatstroke. Thus, severe heatstroke is prevented.

In the heatstroke prevention system 1, the head-mounted device 10 includes the warning device 12 that issues a warning to the wearer when transition of the amount of sweating satisfies a predetermined condition.

In this manner, the wearer can early recognize that he/she is at risk for heatstroke. Thus, severe heatstroke is prevented.

The rehydration alarm system 1 includes the head-mounted device 10 and the management device 91. The head-mounted device 10 includes the communication device 13 that transmits, by wireless communication, information obtained from the first humidity sensor 51 and the second humidity sensor 52. The management device 91 receives information from the communication device 13, and stores and displays the amount of sweating of the wearer.

In this manner, the management device 91 can detect whether the wearer at a remote location needs to be rehydrated. The supervisor can recognize, through the management device 91, that the wearer needs to be rehydrated, and can instruct the wearer to be rehydrated or have a break. Thus, the rehydration alarm system 1 can prevent heatstroke disease caused by the decrease in water in the body of the wearer due to sweating. The rehydration alarm system 1 contributes to safe labor management of a wearer who wears the head-mounted device 10.

The rehydration alarm system 1 includes the warning device 92 that issues a warning to the supervisor when transition of the amount of sweating satisfies a predetermined condition.

In this manner, the supervisor can early recognize that the wearer needs to be rehydrated. Thus, heatstroke disease caused by the decrease in water in the body of the wearer due to sweating can be prevented.

In the rehydration alarm system 1, the head-mounted device 10 includes the warning device 12 that issues a warning to the wearer when transition of the amount of sweating satisfies a predetermined condition.

In this manner, the wearer can early recognize that he/she needs to be rehydrated because of the decrease in water in the body due to sweating. As a result, the wearer can spontaneously drink water with an appropriate amount, or have a break. Thus, heatstroke disease caused by the decrease in water in the body of the wearer due to sweating can be prevented. In the rehydration alarm system 1, an instruction to stay rehydrated from the supervisor by using the warning device 92 and an instruction for the wearer to spontaneously rehydrate his/herself by using the warning device 12 may be used in combination.

REFERENCE SIGNS LIST

1 HEATSTROKE PREVENTION SYSTEM, REHYDRATION ALARM SYSTEM
10 HEAD-MOUNTED DEVICE
11 CONTROL DEVICE
12 WARNING DEVICE
13 COMMUNICATION DEVICE
14 ANTENNA
16 BATTERY
2 OUTER SHELL
21 FLANGE

211 INNER SURFACE
20 MAIN BODY
201 LOWER END PORTION
202 INNER SURFACE
25 BUFFER
250, 251, 252, 253, 254 RECESS
3 INNER SHELL
40 SPACER
41 FIRST FLOW CHANNEL
42, 421, 422, 423, 424 SECOND FLOW CHANNEL
51 FIRST HUMIDITY SENSOR
52 SECOND HUMIDITY SENSOR
54 ENVIRONMENTAL SENSOR
56 BODY TEMPERATURE SENSOR
58 HEARTBEAT SENSOR
6 FAN
9 MANAGEMENT UNIT
91 MANAGEMENT DEVICE
92 WARNING DEVICE
E OUTSIDE

The invention claimed is:

1. A head-mounted device, comprising:
an outer shell;
a first flow channel that is a gap between a head of a wearer and the outer shell;
a second flow channel provided in the outer shell and joining the first flow channel;
a fan configured to blow air from one of the first flow channel and the second flow channel to the other of the first flow channel and the second flow channel;
a first humidity sensor configured to measure an absolute humidity of intake air entering one of the first flow channel and the second flow channel; and
a second humidity sensor configured to measure an absolute humidity of exhaust air exiting from the other of the first flow channel and the second flow channel.

2. The head-mounted device according to claim 1, wherein the fan is configured to blow air with an amount such that a temperature of the exhaust air becomes equal to or higher than a dew-point temperature of the exhaust air.

3. The head-mounted device according to claim 1, wherein the first humidity sensor is located on an outside of the outer shell.

4. The head-mounted device according to claim 1, wherein the first humidity sensor is configured to measure a temperature and a relative humidity of the intake air, and is located on an inner surface of the outer shell.

5. The head-mounted device according to claim 1, wherein
the fan is configured to blow air from the first flow channel toward the second flow channel, and is located at a downstream end portion of the first flow channel, and
the second humidity sensor is located downstream of the fan.

6. The head-mounted device according to claim 1, comprising a body temperature sensor configured to measure a body temperature of the wearer.

7. The head-mounted device according to claim 6, wherein the body temperature sensor is configured to measure a deep body temperature.

8. The head-mounted device according to claim 1, comprising a heartbeat sensor configured to measure a heart rate of the wearer.

9. The head-mounted device according to claim 1, comprising an environmental sensor configured to measure a wet-bulb temperature and a black-bulb temperature around the wearer.

10. The head-mounted device according to claim 1, comprising:
a control device configured to calculate an amount of sweating of the wearer based on information obtained from the first humidity sensor and the second humidity sensor; and
a warning device configured to issue a warning when transition of the amount of sweating satisfies a predetermined condition.

11. A heatstroke prevention system, comprising:
the head-mounted device according to claim 1; and
a management device, wherein
the head-mounted device includes a communication device configured to transmit, by wireless communication, information obtained from the first humidity sensor and the second humidity sensor, and
the management device is configured to receive the information from the communication device, and store an amount of sweating of the wearer.

12. The heatstroke prevention system according to claim 11, comprising a warning device configured to issue a warning to a supervisor when transition of the amount of sweating satisfies a predetermined condition.

13. The heatstroke prevention system according to claim 11, wherein the head-mounted device includes a warning device configured to issue a warning to the wearer when transition of the amount of sweating satisfies a predetermined condition.

14. A rehydration alarm system, comprising:
the head-mounted device according to claim 1; and
a management device, wherein
the head-mounted device includes a communication device configured to transmit, by wireless communication, information obtained from the first humidity sensor and the second humidity sensor, and
the management device is configured to receive the information from the communication device, and store an amount of sweating of the wearer.

15. The rehydration alarm system according to claim 14, comprising a warning device configured to issue a warning to a supervisor when transition of the amount of sweating satisfies a predetermined condition.

16. The rehydration alarm system according to claim 14, wherein the head-mounted device includes a warning device configured to issue a warning to the wearer when transition of the amount of sweating satisfies a predetermined condition.

17. The head-mounted device according to claim 1, comprising a control device configured to calculate an amount of sweating of the head of the wearer based on information obtained from the first humidity sensor and the second humidity sensor, and estimate an amount of sweating of a whole body from the amount of sweating of the head.

18. The head-mounted device according to claim 17, wherein the control device is configured to store a correlation between the amount of sweating of the head and the amount of sweating of the whole body.

* * * * *